United States Patent [19]
Arnold

[11] 3,729,238
[45] Apr. 24, 1973

[54] SELF-ALIGNING, ADJUSTABLE ANCHOR PIN ASSEMBLY

[75] Inventor: Arthur A. Arnold, San Diego, Calif.

[73] Assignee: The United States of America as represented by the Secretary of the Navy

[22] Filed: Sept. 13, 1971

[21] Appl. No.: 179,863

[52] U.S. Cl. .................................308/72, 308/62
[51] Int. Cl. ....................................F16c 23/00
[58] Field of Search ........................308/72, 62; 287/DIG. 8, 88; 16/2; 248/56

[56] References Cited

UNITED STATES PATENTS

| | | | |
|---|---|---|---|
| 66,091 | 1/1867 | Jenks | 308/72 |
| 1,677,514 | 7/1928 | Derr, Sr. | 308/62 |
| 2,134,885 | 11/1938 | Newhouse | 308/62 |
| 2,192,483 | 3/1940 | Augustine | 308/62 |
| 3,572,173 | 3/1971 | Woltjen | 308/62 |
| 1,206,538 | 11/1916 | Howe | 308/62 |
| 3,086,801 | 4/1963 | Herbenar | 287/88 |

FOREIGN PATENTS OR APPLICATIONS

| | | | |
|---|---|---|---|
| 1,004,103 | 9/1965 | Great Britain | 308/72 |
| 616,294 | 5/1926 | France | 308/72 |
| 1,042,216 | 9/1951 | France | 308/72 |
| 230,974 | 3/1925 | Great Britain | 308/72 |

*Primary Examiner*—Allan D. Herrmann
*Assistant Examiner*—R. H. Lazarus
*Attorney*—R. S. Sciascia et al.

[57] ABSTRACT

An anchor pin assembly is both adjustable and self-aligning. The assembly includes an anchor pin substantially cylindrical in shape for mounting on a fixed structure. The anchor pin is received into a bearing comprising two members. The first bearing member is mounted in a fitting having means for attachment to a body to be supported against mechanical shock and includes internal spherical surfaces. A second bearing member has external spherical surfaces which are received and movably supported within the internal spherical surfaces of the first bearing member and the second bearing member has an internal cylindrical bore for slidingly engaging and receiving the cylindrical surfaces of the anchor pin. In a preferred embodiment, the anchor pin is flanged and has an eccentric stud portion which is received and supported within an eccentric, substantially cylindrical, bearing member to afford first and second degrees of pivotal positioning to perfect the alignment of the anchor pin with the central axis of the bearing into which it is received and supported.

2 Claims, 3 Drawing Figures

Patented April 24, 1973

3,729,238

INVENTOR.
ARTHUR A ARNOLD
BY

SELF-ALIGNING, ADJUSTABLE ANCHOR PIN ASSEMBLY

BACKGROUND OF THE INVENTION

In order to provide a desirable degree of accessibility and removability complex equipment such as electronic systems are frequently divided into subassemblies supported in racks or drawers which are received in and secured to larger cabinets or enclosures.

Typical of such arrangements for mounting electronic subassemblies are the apparatus disclosed in U. S. Pat. No. 3,367,732 issued to W. R. Beye, Feb. 6, 1968, and titled "Drawer Securing Apparatus," and U. S. Pat. No. 3,467,461 issued to Henry K. Hauser, Sept. 16, 1969 and titled "Cabinet Security Mechanism."

Electronic subassemblies mounted in such cabinet enclosures which are subject to vibratory and high impact mechanical shocks such as in a naval shipboard installation, for example, require the electronic chassis be adequately secured and supported in order to prevent vibration and shock motions from causing damage to the electronic components as well as to the chassis and the cabinet structures. In order to firmly support rack-mounted chassis against unwanted vibration and mechanical shock, anchor pins have been used to provide the supporting link between the structure of the cabinet enclosure itself and the drawer mounted electronic chassis, which in most cases is arranged to be partially or wholly removable from the cabinet enclosure. The desired degree of accessibility and removability is afforded by employing a supporting link in the form of an anchor pin assembly preferably slidingly received into a bearing support, usually mounted on the drawer portion received into the cabinet structure.

However, it is desirable to keep such structures as light in weight as is possible and consistent with the environment in which it is to be used and the weight of the electronic equipment which it is designed to support. Accordingly, many such cabinet enclosures include racks fabricated of sheet metal and because of slight inaccuracies in manufacture and the tendency of the relatively heavy weight of electronic equipments to slightly distort the configuration of sheet metal structures, a certain amount of minor misalignment is almost unavoidable in most such combinations of equipment.

One prior art concept, as disclosed in U. S. Pat. No. 3,072,423, issued to Roy E. Charlton, on Jan. 8, 1963, provided an eccentric stud and anchor pin device intended to be used in fixed receptacles. This arrangement could compensate for some parallel misalignment between an anchor pin and its fixed receptacle by manipulation of the eccentric to correct the misalignment. For example, such arrangement has been employed in the prior art to aid in the mating of a rear chassis structure of a sliding drawer type of structure with the rear of a cabinet enclosure. However, even with the limited degree of desired realignment afforded by the eccentric anchor pin, the prior art method and means has not been fully successful in accomplishing true alignment and adequate support especially where the structures are made of sheet metal and all the parts that make up the coacting structure, including the receptacles and the anchor pins, are not manufactured and fabricated to relatively stringent manufacturing tolerances.

Moreover, in non-self-aligning anchor pin assemblies of the prior art, particularly where no movement was afforded by the bearing member receiving the anchor pin, severe vibratory or mechanical shock action could disform and bend the anchor pin, jamming it so that disengagement of the anchor pin from the bearing member in which it was received was difficult or impossible.

Accordingly, there is a need for an improved adjustable anchor pin assembly which will afford improved alignment and consequent fully adequate support to prevent unwanted vibration and shock.

Moreover, it is desirable that such improved anchor pin assembly preferably be self-aligning in order to compensate for minor deviations from specifications which may quite readily occur in the manufacture of cabinet enclosures and associated structures such as drawers, for example, which mount and support electronic equipment, when those structures are manufactured of sheet metal as they are quite commonly.

SUMMARY OF THE INVENTION

The self-aligning, adjustable anchor pin assembly of the present invention comprises two principal portions which engage with each other. One portion is the anchor pin and the other is the bearing and support means into which it is received. Customarily, the anchor pin portion may be mounted on a fixed structure, such as a cabinet enclosure which is built and designed to receive drawers having electronic equipments mounted therein.

In a typical installation the rear part of the drawer may have the bearing and supporting portion of the self-aligning, adjustable anchor pin assembly mounted therein. The bearing and support portion of the invention may desirable comprise a first bearing member which is mounted in a fitting having suitable means for attachment to the body to be supported against vibration and shock, such as a drawer supporting electronic equipment.

The first bearing member of the present invention has at least a partial internal spherical surface; a second bearing member having external spherical surfaces is configured and dimensioned to be received and movably supported within the internal spherical surfaces of the first bearing member. The second bearing member also has an internal cylindrical bore dimensioned for slidingly engaging the cylindrical surfaces of the anchor pin, which it will be recalled, in a typical installation may be mounted on a fixed structure such as the rear of a cabinet enclosure.

When the drawer is suitably positioned in the rack of a cabinet enclosure and slidingly received therein, the anchor pin mounted on the rear of the cabinet enclosure is received into the bearing portion of the adjustable anchor pin assembly of the present invention and, because of the described spherical surfaces, is capable of an amount of limited movement for the correction and compensation of any slight misalignment between the axis of the internal cylindrical bore within the second spherical bearing member and the axis of the substantially, cylindrically shaped anchor pin.

In a preferred embodiment of the present invention the anchor pin has a flange portion which bears against the cabinet enclosure structure and also a stud which has an eccentric axis relative to the axis of the anchor pin itself to afford a degree of pivotal positioning of the anchor pin. Additionally, the preferred embodiment of the present invention may also include a substantially cylindrical bearing for receiving the eccentrically fabricated stud portion of the anchor pin, which bearing has an eccentric bore affording a second independent degree of pivotal positioning of the axis of the anchor pin.

Suitable means are provided for fixing the axis of the anchor pin after its pivotal adjustment such securing means typically comprising a self-locking nut which may be tightened down on a threaded portion of the eccentric stud to secure the flange of the anchor pin against the structure such as the rear of the cabinet enclosure, maintaining the desired pivotal adjustment and alignment of the anchor pin with the internal cylindrical surfaces of the spherical bearing member.

A most important feature and advantage of the present invention is that its self-aligning bearing member, into which the anchor pin is received affords a limited degree of movement under severe vibratory and shock conditions preventing deformation of the anchor pin in nearly all instances; notwithstanding that he anchor pin may be slightly deformed or bent out of its initial and correct axial alignment, under extremely severe shock the pin will not jam in the self-aligning bearing member and therefore may be readily withdrawn without difficulty or inconvenience.

The preferred embodiment of the present invention also has an anchor pin which is conically shaped so as to be readily received into the engagement with the internal cylindrical surfaces of the bearing members, even through a degree of initial misalignment is present.

Accordingly, a primary object of the present invention is to provide an improved anchor pin assembly for preventing unwanted mechanical shock and vibration between a substructure and a main structure into which it is received by compensating for small degrees of misalignment which may exist between the substructure and the main structure.

An equally important object of the present invention is to devise an anchor pin assembly which is capable of adjusting for such minor misalignments by a self-alignment coaction when its parts are brought into engagement with each other.

Yet another most important object of the present invention is to provide an anchor pin assembly which when in engagement will yield to minor misalignments caused by extreme vibratory or shock movement in order to prevent deformation and/or jamming of the anchor pin.

Another object of the present invention is to provide an anchor pin assembly which affords self-alignment features and maximum flexibility of adjustable movement to assure optimum alignment.

These and other features, objects, and advantages of the present invention will be better appreciated from an understanding of the operative principles of a preferred embodiment as described hereinafter and as illustrated in the accompanying drawings.

DESCRIPTION OF THE PREFERRED EMBODIMENT

Figure 1:
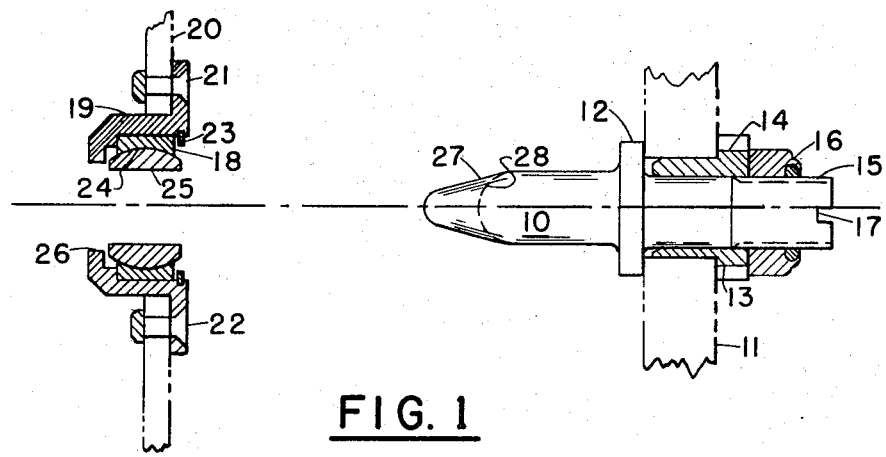
FIG. 1 is a partially cross-sectional view of a preferred embodiment of the self-aligning adjustable anchor pin assembly of the present invention.

In FIG. 1 an anchor pin 10 having substantially cylindrical surfaces is mounted on a fixed structure 11. A flange portion 12 of the anchor pin 10 bears against the fixed structure 11 and a stud portion 13 of the anchor pin 10 is fabricated so that its central axis is eccentric relative to the axis of the cylindrical surfaces of the main portion of the anchor pin 10.

The eccentric stud portion 13 of the anchor pin 10 is received and supported in a bearing member 14 which has an eccentric bore, as may readily be discerned from the difference in the thickness of the walls of the bearing on its upper portion as illustrated in FIG. 1, as compared to its lower portion. The end of the eccentric stud portion 13 of the anchor pin 10 may be threaded, as illustrated at 15, to receive an appropriate securing means such as a self-locking jam nut 16. A slot 17 in the stud portion 13 of the anchor pin 10 affords rotational pivotal adjustment.

The anchor pin 10 and its substantially cylindrical surfaces are received into and supported in a bearing assembly which may be attached or affixed to the body to be supported against shock. A first bearing member 18 is mounted in a fitting 19 for attachment to a body 20 to be supported against mechanical shock and may be secured by rivets such as are illustrated at 21 and 22, which are preferable because of the relatively thin cross-section of sheet metal structures. The first bearing member may be suitably retained in the fitting 19 by a snap ring 23 as illustrated in FIG. 1.

It will be noted that the first bearing member 18 has internal spherical surfaces as are illustrated at 24 in the cross-sectional view of FIG. 1. A second bearing member 25 has external spherical surfaces which are configured and dimensioned to be received and movably supported within the internal spherical surfaces 24 of the first bearing member 18. The second bearing member 25 also has an internal cylindrical bore which is configured and dimensioned to slidingly receive and engage the cylindrical surfaces of the anchor pin 10.

Figure 2:
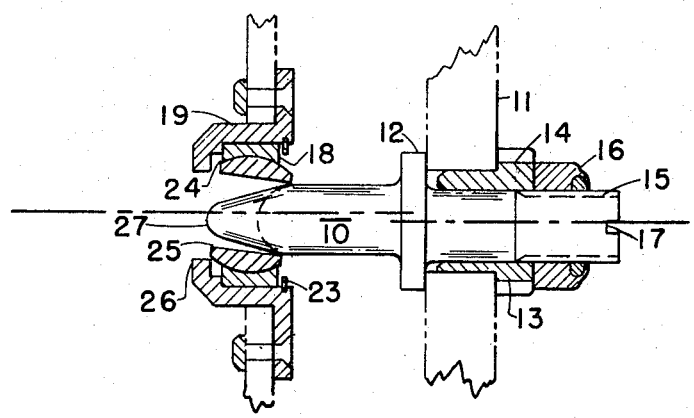
FIGS. 2 and 3 illustrate two successive stages of the self-aligning coaction of the anchor pin assembly of the present invention as they are brought into engagement.
Figure 3:
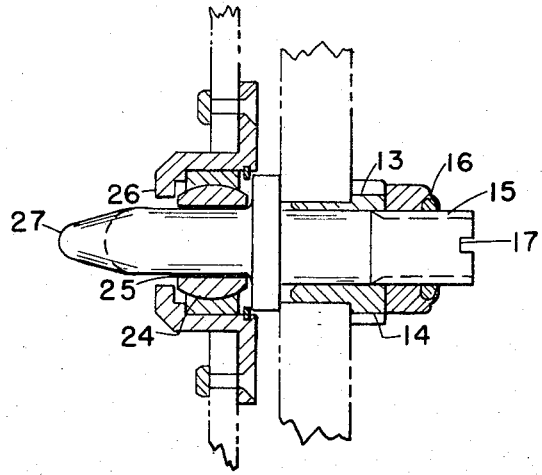

The internal and external spherical surfaces which engage the first bearing member with the second bearing member, respectively, afford a degree of movement of the second bearing member 25 so that the central axis of its cylindrical bore may be readily varied and adjusted. Such variation and adjustment provides an important aspect of the self-aligning advantage and feature of the present invention. FIGS. 2 and 3 illustrate this feature and advantage by showing the manner in which the several portions of the self-aligning adjustable anchor pin assembly of the present invention coact with each other, yielding to slight initial misalignments and adapting to several degrees of pivotal adjustment in order to perfect the final desired alignment.

In FIGS. 2 and 3 elements bear the same numerical designations as in FIG. 1. In FIG. 2 the axis of anchor pin 10 is not in alignment with the axis of the internal cylindrical bore of the second bearing member 25, but the anchor pin nonetheless can enter into engagement with the second bearing member and is shown as being partially inserted therein. By adjustment of the bearing 14, which has an eccentric bore supporting the stud portion 13 of the anchor pin 10, together with the rotation of the anchor pin 10 by means of the slot 17, a null point will be found where there is a substantial absence of resistance and friction, denoting substantial alignment of the central axis of the cylindrical surfaces of the anchor pin 10 with the central axis of the inner cylindrical bore of the secondary member 25.

FIG. 3 illustrates such adjustment and it will be noted that the eccentric inner bore of bearing 14 has accommodated raising the central axis of the anchor pin 10 into substantial alignment with the axis of the inner cylindrical bore of the secondary member 25. After such adjustment the coacting members of the anchor pin assembly are brought together in final full engagement, as is illustrated in FIG. 3.

It will be appreciated by those skilled and knowledgeable in the art that in the event of severe vibratory or shock motion between the two portions of the anchor pin assembly, any displacement of the axis of the anchor pin 10 relative to the bearing member 25 into which it is received will be accommodated by resultant slight movement and self-aligning adjustment of the bearing member 25. This avoids deformation or bending of the anchor pin 10, preventing it from becoming jammed against the cylindrical surfaces of the bearing member 25.

In the prior art such engaging surfaces were adjusted in a fixed relationship. As a result, anchor pins could, and sometimes did, become jammed irretrievably because of deformation or bending caused by extreme vibratory or shock movements between two parts of a structure, such as a drawer slidingly received in a rack type cabinet enclosure. This very undesirable condition and situation is avoided by the unique coacting properties of the anchor pin assembly of the present invention, by reason of which yielding movement is provided, even to temporary, momentary misalignments.

Moreover, the double eccentricity comprising the eccentric axis of the stud portion of the anchor pin assembly of the present invention, together with the eccentric internal bore of the bearing into which it is received and supported, affords two independent degrees of pivotable positioning providing a high degree of flexibility in adjustment to achieve the finally desired aligned position of the assembly.

Further, the fitting in which the self-aligning bearing members 25 and 18 are mounted may desirably have a shoulder portion as shown at 26 which is configured and dimensioned to prevent the rotational movement at the second bearing member beyond a predetermined amount, thus assuring that an anchor pin such as that illustrated in FIGS. 1, 2, and 3 having a tapered conical portion as shown at 27 can always be received within the inner cylindrical bore of the second bearing member 25. As shown by the dashlines 28, the anchor pin 10 may alternatively have a hemispherically shaped end.

As will be readily appreciated by those knowledgeable in the art and aware of the problems of vibration and shock to which the present invention is directed, the preferred embodiment of the concept and teaching of the present invention as illustrated in FIGS. 1, 2, and 3 may be varied and configured to meet particular needs without departing from the spirit and concept of the invention.

Obviously many modifications and variations of the present invention are possible in the light of the above teachings. It is therefore to be understood that within the scope of the appended claims the invention may be practiced otherwise than as specifically described.

What is claimed is:

1. A self-aligning, adjustable anchor pin assembly comprising:
   a first bearing member mounted in a fitting having means for attachment to a body to be supported against mechanical shock,
   said first bearing member having at least partial internal spherical surfaces;
   a second bearing member having external spherical surfaces configured and dimensioned to be received and movably supported within said internal spherical surfaces,
   said second bearing member having an internal cylindrical bore;
   an anchor pin having substantially cylindrical surfaces with a conically tapered end for slidingly engaging said internal cylindrical bore and accommodating slight misalignment of said cylindrical surfaces relative to said cylindrical bore;
   a flange extending laterally from the base of said cylindrical surfaces for supporting said anchor pin against a fixed structure;
   a stud eccentrically extending opposite the tapered end of said anchor pin affording a first pivotal adjustment of the alignment of the anchor pin with said cylindrical bore;
   a cylindrical bearing rotatably supported on a fixed structure and having an eccentric bore for receiving and supporting said stud to afford a second degree of pivotal adjustment of the alignment of the anchor pin with said cylindrical bore; and
   means attached to said stud for maintaining the desired rotatable disposition of said bearing by securing said flange in compression against said fixed structure.

2. A self-aligning, adjustable anchor pin assembly as claimed in claim 1 wherein said fitting has a shoulder extending proximate to said second bearing member for limiting its rotational movement within said first bearing member to a determinable amount.

* * * * *